Dec. 29, 1959  E. H. MUMFORD  2,918,756
METHOD OF TRANSFERRING PARISONS
Filed June 22, 1955  3 Sheets-Sheet 1
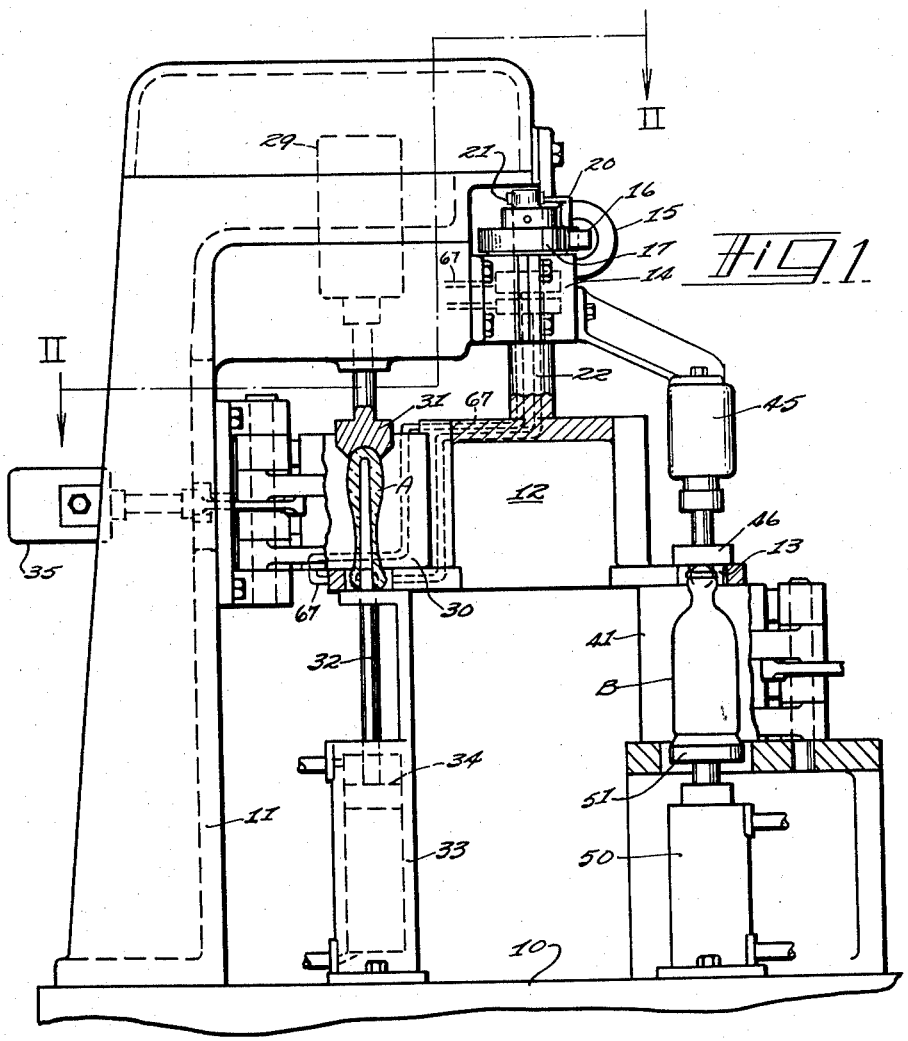
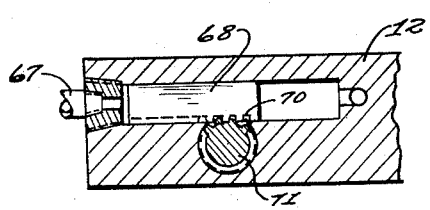
INVENTOR.
EUSTACE H. MUMFORD
BY
W. H. Schuch
L. D. Doubie
ATTORNEYS Dec. 29, 1959  E. H. MUMFORD  2,918,756
METHOD OF TRANSFERRING PARISONS
Filed June 22, 1955  3 Sheets-Sheet 2
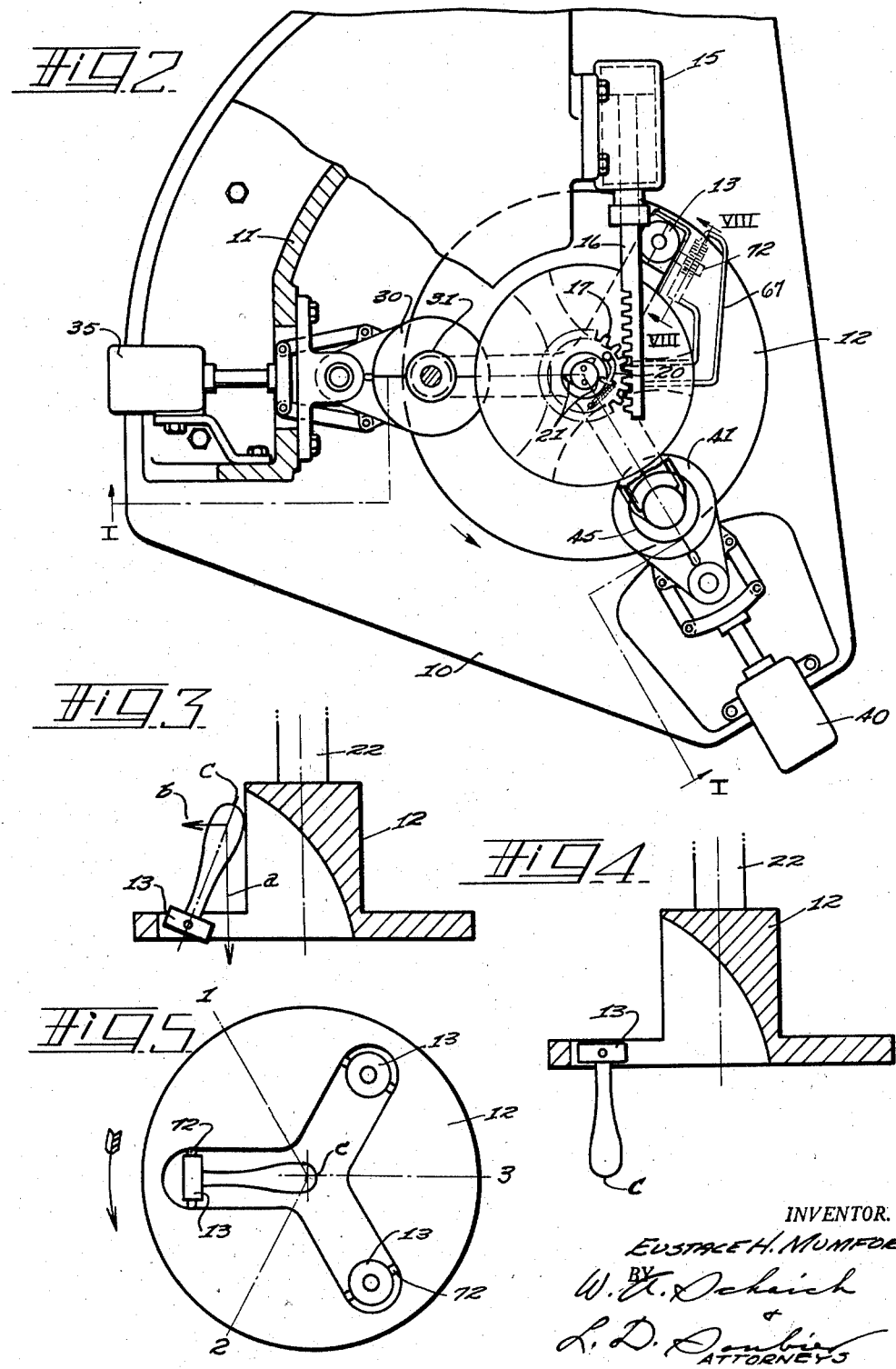
INVENTOR.
EUSTACE H. MUMFORD
BY
ATTORNEYS Dec. 29, 1959  E. H. MUMFORD  2,918,756
METHOD OF TRANSFERRING PARISONS
Filed June 22, 1955  3 Sheets-Sheet 3
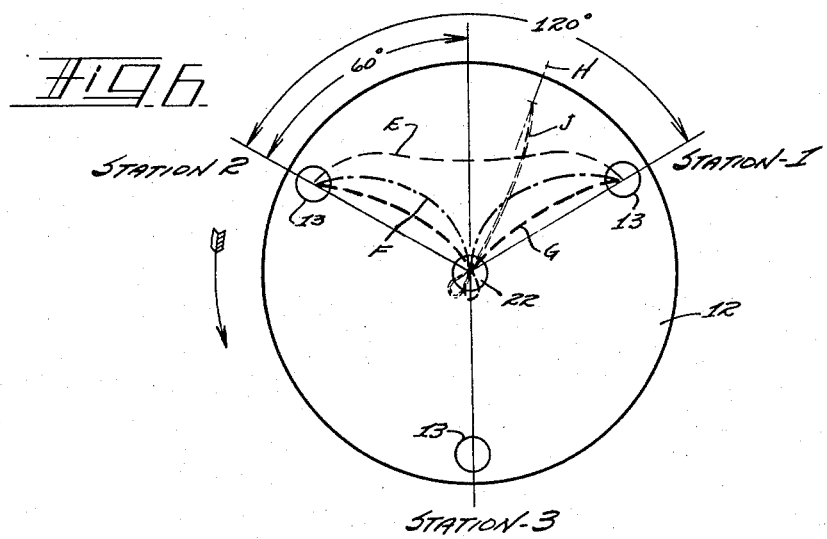
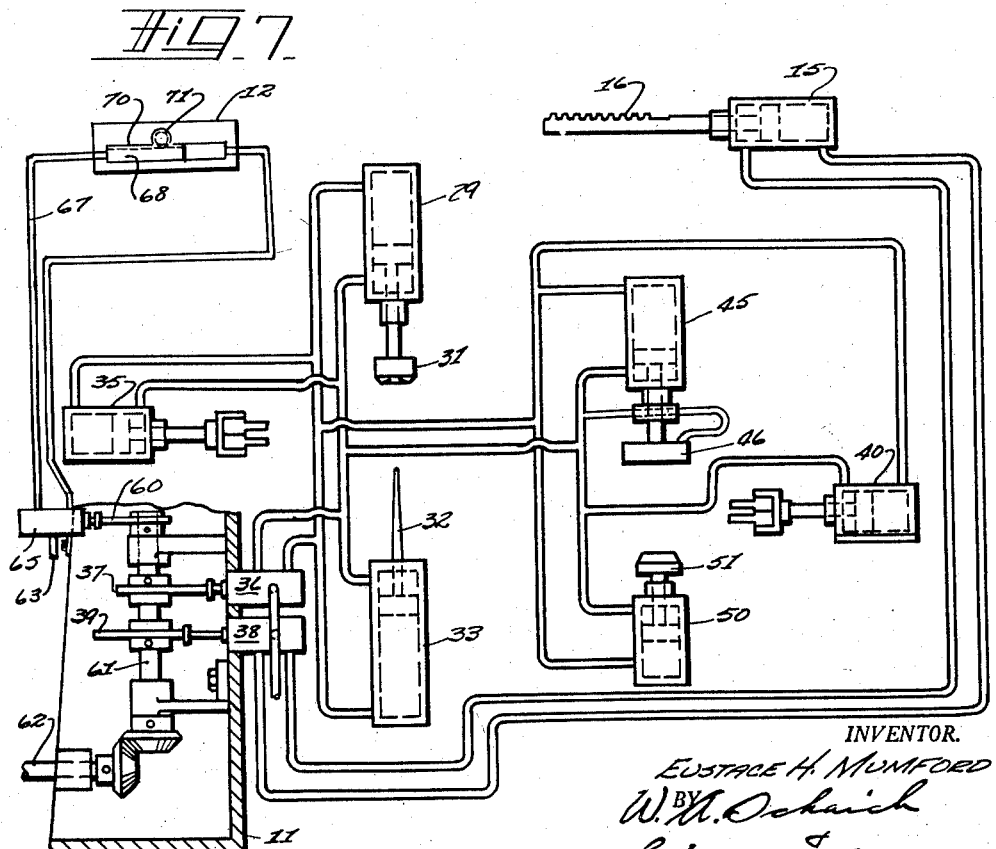
INVENTOR.
EUSTACE H. MUMFORD
BY
ATTORNEYS

United States Patent Office 2,918,756
Patented Dec. 29, 1959

2,918,756

METHOD OF TRANSFERRING PARISONS

Eustace H. Mumford, Ottawa Lake, Mich., assignor to Owens-Illinois Glass Company, a corporation of Ohio Application June 22, 1955, Serial No. 517,130

4 Claims. (Cl. 49—80)

My invention relates to a method of inverting hot glass parisons during their transfer from a shaping station to a blowing station and particularly to obviate or reduce the adverse effects of centrifugal force during such transfer and inversion.

In the usual bottle forming machines, the transfer of a parison from the forming station to the blowing station is accomplished in such a manner that the gravitational and centrifugal forces generally affect the shape in some manner, i.e., either these forces act to stretch the parison through its length or bend it out of shape.

In order to obviate or reduce the adverse effects of centrifugal force it is contemplated to utilize the force of gravity as a counterbalance to any centrifugal forces generated during the transfer operation.

Such adverse effects as above mentioned are particularly noticeable in a machine of the intermittent motion type where indexing from one station to another is a requisite and where the acceleration and deceleration encountered in such motion is highly detrimental to the production of quality ware. It is contemplated that this invention be applicable to either a blow and blow machine, a press and blow machine, or any other form of a machine wherein it is necessary to invert a blank or parison.

Among the various objects of this invention, the primary one is to effect a parison inversion and transfer without adversely affecting its shape or size.

A further object is to provide a transfer wherein the usual high radial velocities are counteracted and reduced to a minimum.

A still further object is to cause the parison to pass through a zone of nullified centrifugal and gravitational forces during the transfer.

Other objects will be in part apparent and in part pointed out hereinafter.

In the drawings:

Fig. 1 is a part sectional elevational view taken approximately at I—I on Fig. 2;

Fig. 2 is a part sectional plan view taken at line II—II on Fig. 1;

Figs. 3, 4, 5, and 6 are diagrammatic views illustrating the paths of travel of a parison during the inversion thereof;

Fig. 7 is a machine piping diagram; and

Fig. 8 is a part sectional view taken at line VIII—VIII on Fig. 2, illustrating the parison conversion mechanism.

This present invention has been illustrated in the accompanying drawings as applied to a press and blow type of bottle forming machine, but the same general mechanical arrangement is also applicable to a blow and blow type bottle forming machine.

Referring to the drawings and in particular to Fig. 1 thereof, 10 represents the base of a glass forming machine supporting a vertical column 11 which is adapted to mount a rotatable mold carrying turret 12 in a support bearing 14. The turret 12 is adapted to carry a series of neck forming molds 13 and is indexed from one station to another by means of an air motor 15 and a rack and pinion 16 and 17. A ratchet mechanism comprising a pawl 20 and ratchet teeth 21 on the vertical shaft 22 is adapted to index the turret 12 in one direction and to provide free movement of the rack 16 on its retractive stroke.

A series of forming stations are provided in this machine. Number one is a loading and forming station for the blanks or parisons, number two is a blowing station, and number three is the take-out station for the finished ware. At the loading station the charge of molten glass is provided to the blank mold 30, a baffle plate 31 is then moved by air motor 29 to close the open upper end of the inverted mold. A plunger 32 is then projected through the bottom end of the mold 30 to displace the molten glass and form a parison "A" by means of the displacement pressure. A piston motor 33 through piston 34, provides the power to plunger 32 for pressing the parisons at station number one.

At the completion of the compression of the parison, the baffle 31 and plunger 32 are withdrawn from mold contact and an air motor 35 is actuated by valve 36 and cam 37 to open the halves of the blank mold 30 away from the parison "A." The air motor 15 is then actuated through valve 38 and cam 39 to index the table 12 and carry the neck mold 13 from the loading station to the blowing station. Previous to this movement of the table 12 and during said movement, the parison "A" is swung inwardly towards the axis of rotation of the turret 12 and then downwardly to a vertical pendant position. The parison "A" has reached this pendant position by the time this turret has reached the blowing station. The inversion of the parison "A" is controlled by a cam and valve mechanism to be later described herein.

As station number two is reached, air motor 40 is actuated to close the blow molds 41 about the pendant parison. Simultaneously with the closing of the blow molds, air motor 45 is actuated to position a blow head 46 on top of the neck mold and air is admitted through the blow head 46 to the opening in the parison to expand the same to final shape in the blow mold 41. Air motors 40, 45, and 50 are controlled by valve 36 and cam 37. At the same time bottom plate 51 is elevated by air motor 50 to close the bottom of the mold.

With the completion of the blowing operation, the blow molds are opened by the air motor 40, the air motor 50 is actuated to lower the bottom plate 51, and the table or turret 12 is indexed, carrying the neck mold 13 and its pendant blown bottle "B" to the take-out station number three where the neck molds 13 are opened and the blown article released to a conveyor or any other handling means.

The above described mechanical operation of this glass forming machine is in some respects similar to that usually found in glass forming machines with the single exception that the inversion of the parison during the movement of the neck molds from one station to another is accomplished in a specific manner, this manner being the essence of this present invention.

As the parison molds 30 are opened at station number one the table or turret 12 may begin its indexing motion, which in this instance and as illustrated, is a distance of 120°. A cam 60 on a cam shaft 61 driven by any usual power shaft 62, actuates a three-way valve 65 to supply air from main line 63 to a pipe 67 leading to one end of a piston 68, causing said piston to move radially inwardly of the turret 12. One side of the piston 68 has rack teeth 70 formed thereon, which are in mesh with a pinion 71 formed on one end of the horizontal fulcrum shaft 72 forming the neck mold turnover support. The actuating air to the moving parts mounted on the indexing table 12 may be supplied to such parts in the manner usual to rotary machines, that is, the air lines enter through the center shaft 22 of the table.

The inversion of the parison may begin prior to the start of the indexing and be accomplished or completed during the indexing of the neck molds from the loading and forming station to the blowing station and such inversion may be accomplished either in the entire 120° or within any desired portion thereof. In this transfer or inversion of the parison, one end of the parison is of course captive in the neck molds and the other end of the parison C is free, thus as the inversion is accomplished, the end of the parison C will follow a predetermined path depending of course on the length of the parison and the position of the point C with respect to the vertical center line of the vertical shaft 22, about which the turret 12 is indexed. For example, in Fig. 6 a light dotted line E illustrates the pattern which would be followed by the point C on a parison during its inversion providing of course the inversion is accomplished in the full 120° of index. The dotted line E indicates the path followed by the point C if the length of the parison is less than the radius between the center of turret 12 and the center of the neck molds. The dot-dash line F indicates the path which would be followed by the point C if the parison is the same length as that of the radius between the center of the turret 12 and the center of the neck molds. If the parison is of a length greater than that of the above-mentioned radius of the neck molds, then the path of the point C of said parison will be such as indicated by the heavy dotted line G, providing of course that the inversion is accomplished within the full 120°.

If the inversion is accomplished in a lesser number of degrees than 120° then the path of course followed by the point C on any given length of parison will form many and varied patterns. However, as an illustration of one pattern, the initial part of the heavy dotted line G up to line H indicates the path followed by C on a parison having a length greater than the radius of the neck molds. But if the inversion is to be completed by the time the neck mold moves horizontally to line H, then the path of the point C on the parison will cause it to complete its movement by following the path indicated by the double dotted line J.

In any of these inversions and regardless of the length of the parison, the point C on any parison will follow a path which is a composition of two circular motions and which will result in point C following a pattern generated along the surface of a toroid.

During the inversion of a parison and regardless of the length thereof, the point C on any parison will always pass through a zone in which there is either a reduced amount of horizontal motion or no relative horizontal motion with respect to the vertical axis of the turret 12. Also, in this inversion there is a point, such as that diagrammatically illustrated in Fig. 3, at which the maximum effect of centrifugal force (as indicated by arrow "$b$") is obviated or counterbalanced by the force of gravity (as indicated by arrow "$a$") thus keeping the parison from being distorted by these forces.

In any intermittent motion machine, i.e., a machine that is indexed intermittently from one station to another, it is of course quite obvious that the table will reach at some point its maximum speed of rotation and then gradually decrease to come to rest at the next station. In other words, there is a progressive increasing and decreasing effect in the motion. When the parison inversion mechanism is actuated and the point C on a parison begins to move towards the center of rotation of the turret it may also move at a progressively increasing speed in its vertical plane until it reaches a horizontal position (Fig. 5) and then a progressively decreasing motion is accomplished in said plane until the parison comes to rest in the pendant position as is shown in Fig. 4. The velocity pattern of the inversion of the parison may be of any desired type, i.e., constant, variable, step-by-step, etc. Thus the point C on the parison will have a progressively increasing and decreasing motion about its center of inversion during the inversion period, and at the same time it will be having a progressively increasing and decreasing motion about the center line of the vertical axis of the turret 12. Because of these consonant motions the parison when it reaches the horizontal position (as indicated in Fig. 5) the point C thereon will be in or passing through a zone of either reduced or non horizontal motion.

Modifications may be resorted to within the spirit and scope of the appended claims.

I claim:

1. The method of reverting an inverted parison which comprises simultaneously moving said parison in both vertical and horizontal planes of rotation while causing the free end of said parison to pass through a zone of substantially reduced horizontal motion.

2. The method of reverting an inverted parison which comprises simultaneously moving said parison about horizontal and vertical axes while moving the free end of said parison through an arcuate path the horizontal radius of which first decreases and then increases with respect to said vertical axis, the decrease and increase thereof being equal to the total length of said parison.

3. The method of reverting an inverted parison which comprises simultaneously moving said parison bodily about both horizontal and vertical axes while moving the free end of said parison bodily and sequentially first toward and then away from said vertical axis.

4. The method of forming narrow neck glassware which comprises feeding a gob of molten glass into the open upper end of an inverted parison mold, closing said open end of the mold, forming the gob to hollow shape therein, opening the parison mold away from the formed parison, moving the parison simultaneously about horizontal and vertical axes thereby bringing said parison to reverted position, the said reversion of said parison occurring entirely in a zone of motion wherein the horizontal motion of the free end of said parison sequentially decreases to a minimum and then increases to a maximum, enclosing said parison in a blow mold and expanding same to final form.

References Cited in the file of this patent

UNITED STATES PATENTS

| 998,735 | Arbogast | July 25, 1911 |
| 1,329,253 | Olsen | Jan. 27, 1920 |
| 1,550,346 | Cramer | Aug. 18, 1925 |
| 1,648,792 | Tremblay | Nov. 8, 1927 |
| 1,826,019 | Peiler | Oct. 6, 1931 |
| 2,609,943 | Winder | Sept. 9, 1952 |